L. H. BRINKMAN.
FLEXIBLE TUBE.
APPLICATION FILED SEPT. 11, 1916.

1,340,818.

Patented May 18, 1920.

Louis H. Brinkman INVENTOR

BY Thomas Howe ATTORNEY

L. H. BRINKMAN.
FLEXIBLE TUBE.
APPLICATION FILED SEPT. 11, 1916.

1,340,818.

Patented May 18, 1920.
2 SHEETS—SHEET 2.

Louis H. Brinkman INVENTOR

BY Thomas Howe ATTORNEY

UNITED STATES PATENT OFFICE.

LOUIS H. BRINKMAN, OF GLEN RIDGE, NEW JERSEY, ASSIGNOR TO TITEFLEX METAL HOSE CORPORATION, A CORPORATION OF NEW YORK.

FLEXIBLE TUBE.

1,340,818.　　　　　　　Specification of Letters Patent.　　Patented May 18, 1920.

Application filed September 11, 1916. Serial No. 119,426.

*To all whom it may concern:*

Be it known that I, LOUIS H. BRINKMAN, a citizen of the United States, residing at Glen Ridge, county of Essex, and State of New Jersey, have invented certain new and useful Improvements in Flexible Tubes, of which the following is a specification.

This invention relates to tubing having corrugations, the flexing of the tube being permitted by movement of the sides of the corrugations toward and away from each other.

The main object of the present invention is to prevent damage to the tube and prevent its undue distortion when subjected to heavy stresses.

Other and ancillary objects of the invention will appear hereinafter.

In the accompanying drawings, which illustrate the invention,

Figs. 9, 10, 11, and 12, are similar views of the hose shown respectively in Figs. 2, 3, 6 and 7.

Figure 1:
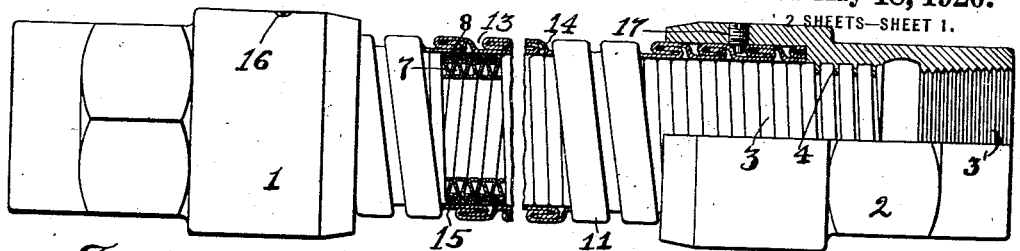
Figure 1 is a view of a hose or coupling embodying the invention, partially in section and broken away at the center.
Figure 8:
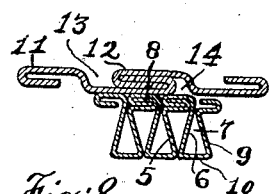
Fig. 8 is a fragmentary axial section of the hose shown in Fig. 1.

Referring to the drawings, and first to Figs. 1 and 8, a hose is therein shown as included in a coupling adapted for use in connecting pipes such, for instance, as air pipes, on adjacent cars of a train, and for other uses. The terminals 1 and 2 of the coupling are screw threaded as at 3' for attachment to the pipe ends. To each of the terminals is secured a corrugated flexible tube 3 by any suitable means as by screwing the end into the threads 4 in the terminal. This tube permits of flexure by relative movement of the sides of the corrugation 5 and 6. Preferably the corrugated tube is formed of a spirally wound strip or ribbon having the groove 7 formed lengthwise of the strip and adjacent edges of contiguous convolutions being interfolded as shown at 8 to form a fluid tight joint. Preferably this joint is at the outermost portion of the wall of the tube 3. The sides 6 and 9 of the groove in the strip are also here shown as reflexed with relation to the bottom 10 of the groove and this is the preferred form, but the sides may have other angular relations.

Outside the tube 3 is a tube 11. This is the outer tube and is for the mechanical protection of the inner corrugated tube protection of the inner corrugated tube from danger from excessive distortion under great stress or from coming into collision with foreign objects. This outside tube is shown as formed of a spirally wound strip having adjacent edges of the convolutions interfolded as shown at 12. The joints 12 are not fixed, however, but are provided with clearances as 13 and 14 which permits the edges of adjacent convolutions to slide with relation to each other so that lengthening or shortening of the tube to a certain extent and also limited bending movement of the tube is permitted. The inner corrugated tube being tight, where it is desired to transmit fluid without leakage, it is not necessary that the outer tube should also be tight. It is desirable, however, that it should be mechanically strong and the strip is therefore mechanically heavier and stronger in the outer tube than that of the inner tube.

To prevent rubbing or knocking of the inner and outer tubes together a suitable cushioning substance 15 is interposed between the inner and outer tubes. This substance may be a tape wound about the inner tube before it is inserted in the outer tube, or a tube of wicking or other textile fabric might be placed about the inner tube. Other cushioning means might also be employed. The material should of course, however, be of such a nature that it will not interfere with the flexing of the hose. The outer tube is secured in each of the terminals 1 and 2 by means of set screws 16 and 17. In assembling the hose in the terminals, the outer tube is preferably fully extended and the inner tube is fully compressed as shown. Flexure of the hose is permitted by sliding in the joints of the outer tube and relative movement of the corrugation sides of the inner tube.

Figure 2:
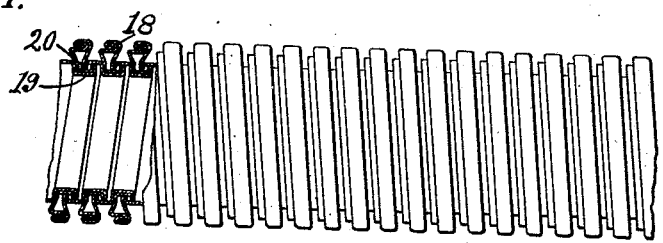
Figs. 2 and 3, are each a side elevation, partially in section of a modified form of hose.
Figure 9:

In the structure of Figs. 2 and 9, a corrugated tube is formed of a strip helically wound and having the edges of adjacent convolutions interfolded as shown at 18. The strip is bent back upon itself at one point to form the hook 19 and at another point to form the flange 20. The flange 20 of one convolution enters within the hook 19 of an adjacent convolution, there being normally clearances as 21 and 22 between the flange and the sides of the hook so that the sides of the corrugations may move to and from each other. This movement is, however, limited by the flange coming against the sides of the hook so that the tube will be protected against undue distortion or damage by excessive bending or pulling upon the tube.

Figure 3:
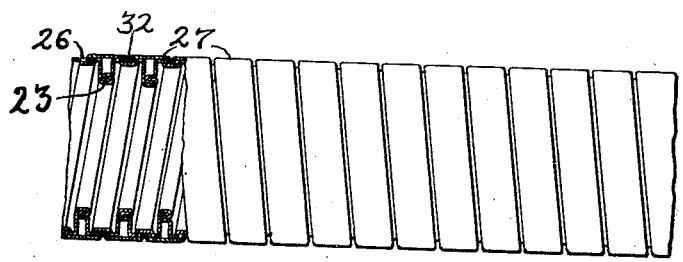
Figure 10:
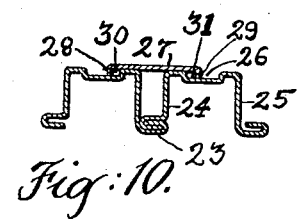

In Figs. 3 and 10 is shown a structure wherein a corrugated tube is formed by winding a ribbon or strip helically and securing the edges of adjacent convolutions together by interfolding as shown at 23. The strip is formed with a corrugation having sides 24 and 25, a groove 26 being formed at the apex of the corrugation. About the corrugated tube is wound a strip 27 having the flanges 28 and 29 which enter the groove 26 on adjacent corrugations. Flexure of the tube, and extension or compression of it, is permitted by relative movement of the corrugation sides, there being suitable clearances between the strip flanges at the edges of the groove as at 30 and 31 and also between the strip flanges as at 32. While this arrangement permits the tube to be extended or bent to a certain degree, the engagement of the strip flanges as 28 and 29 with the sides of the groove 26 limits this movement so that the tube is prevented from being unduly distorted by excessive bending action or pull.

Figure 4:
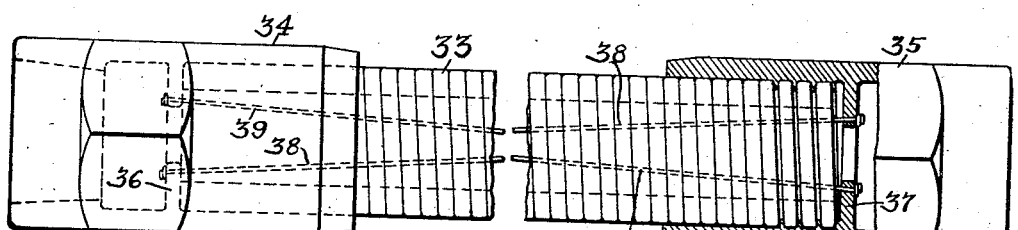
Figs. 4 and 5, are elevations of still further modified forms of couplings, being partly in section.

In Fig. 4 is shown a corrugated tube 33 secured in end terminals 34 and 35, this portion of the structure being similar to the corrugated tube 3 and terminals 1 and 2 of Fig. 1. The terminals are, however, provided with flanges 36, and 37, between which extend rods 38 and 39, having their ends secured in the flanges. These bars may be flexible to a certain degree and while the tube may be bent it is secured against excessive longitudinal distortion by the rods 38 and 39 which resist longitudinal tension tending to unduly distort the tube.

Figure 5:
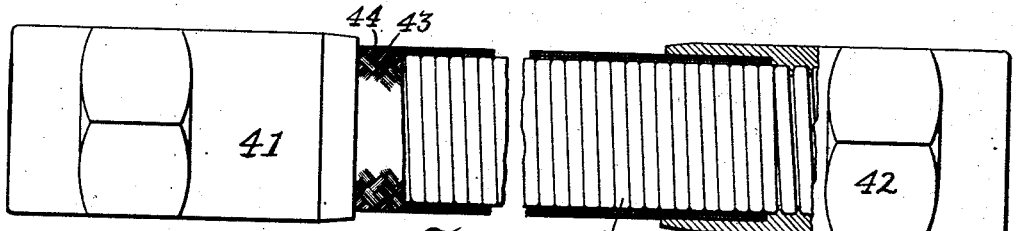

In the structure shown in Fig. 5 a corrugated tube 40, which may be similar to the tube 3 of Fig. 1 is similarly secured in terminals 41 and 42. Wound spirally around this tube in opposite directions are strands as 43 and 44 having their ends secured to the terminals 41 and 42 by soldering or otherwise. These strands may be each a single strip of metal or formed of a number of threads of metal or may be of other formation. They may be interwoven with each other as shown. This structure permits bending of the hose and also longitudinal extension of it. When, however, there is any lengthening of the hose the stranded covering, being lengthened, is reduced in diameter. The reduction in diameter brings the covering against the inner corrugated tube so that its inward movement is limited, the inner corrugated tube being peculiarly strong to resist radial pressure, this capacity for radial resistance being augmented by the reinforcement afforded by the quadruple thickness of material at the joint where adjacent edges of the spirally wound strip are interfolded.

It will be seen that the strands or strips 43 and 44 which are spirally wound around the tube in opposite directions and secured to the terminals 41 and 42 will prevent twisting of the structure. This is an important feature as the tube 40 is more likely to be injured by forces tending to twist it than by those applied in other ways.

Figure 6:
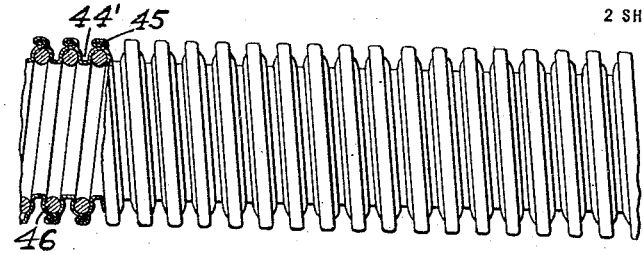
Figs. 6 and 7 are elevations with partial sections of still further modified forms of hose.
Figure 11:
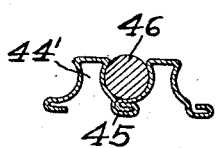

In the structure shown in Figs. 6 and 11 a corrugated tube is formed by helically winding a strip having a central longitudinal groove 44' and having the edges of adjacent convolutions secured together by interfolding as shown at 45. A wire 46 is wound into the corrugations upon the inside of the tube. It will be apparent that the wire thus wound will be in the form of a helix. This should have sufficient elasticity so that when the hose is bent the convolutions will be brought nearer upon one side and farther apart on the opposite side of the tube so that the sides of the corrugations may correspondingly move toward and away from each other to permit the flexing. The wire helix, however, offers a greatly increased resistance to excessive stress tending to unduly spread the corrugation so that distortion of the corrugated tube is prevented.

Figure 7:
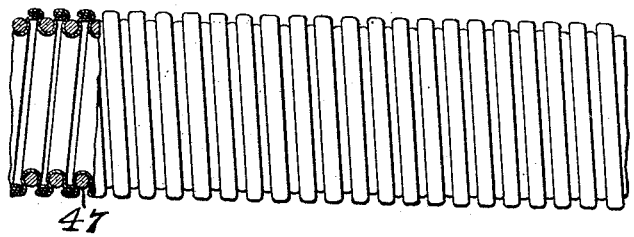
Figure 12:
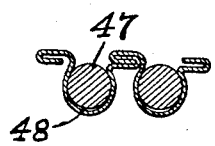

In the structure shown in Figs. 7 and 12 a tube is shown which is like that of Fig. 6 except that the wire 47 is wound upon the outside of the tube between the corrugations. The action is similar except that in elongating the wire helix becomes of less radius and consequently suitable clearance as 48 is provided between the wire and the bottom of the groove in which it is wound.

While the invention has been illustrated in several modifications, it may have other embodiments without departing from its spirit and is not therefore limited to the structures shown in the drawings.

Having thus described my invention, what I claim as new and desire to secure by Letters Patent is:—

1. The combination with a corrugated tube depending for flexibility upon the bending of the metal to permit the corrugation sides to move toward and away from each other; of a flexible tubular structure outside said tube and coupling terminals secured to the ends of said structure.

2. The combination with a corrugated tube depending for flexibility upon the bending of the metal to permit the corrugation sides to move toward and away from each other; of a flexible tubular structure outside said tube, and coupling terminals secured to the ends of said structure, said tubular structure bridging across the groove between corrugations and not entering therein, whereby engagement of the said structure against the corrugation sides as they move toward and away from each other during flexure of the tube is prevented.

3. The combination with a corrugated tube depending for flexibility upon the bending of the metal to permit the corrugation sides to move toward and away from each other, of a flexible outer tube inclosing the said corrugated tube and comprising a helical strip having the edges of adjacent convolutions joined together with clearances permitting relative movement of the parts in the joint, the said outer tube bridging across the groove between corrugations and not entering therein, whereby engagement of the said outer tube against the corrugation sides as they move toward and away from each other, as the tube is flexed, is prevented, and coupling terminals secured to the ends of said outer tube.

4. The combination with a corrugated tube comprising a helical strip, having a longitudinal groove and having the edges of adjacent convolutions interfolded in a fluid tight joint, the tube depending for flexibility upon the bending of the metal to permit the corrugation sides to move toward and away from each other, of a tubular structure outside said tube and coupling terminals secured to the ends of said structure.

5. The combination with a corrugated tube comprising a helical strip, having a longitudinal groove and having the edges of adjacent convolutions interfolded in a fluid tight joint, the tube depending for flexibility upon the bending of the metal to permit the corrugation sides to move toward and away from each other, of a tubular structure outside said tube and bridging across the groove between corrugations of the inner tube and not entering therein, whereby engagement of the said structure with the corrugations sides as they move toward and away from each other as the tube is flexed, is prevented.

6. The combination with a corrugated tube depending for flexibility upon the bending of the metal to permit the corrugation sides to move toward and away from each other, said tube comprising a helical strip having edges of adjacent convolutions interfolded and said strip having a longitudinal fold or groove, the said interfolded edges being at the outer most portion of the wall of the tube, of a tubular structure enveloping said corrugated tube.

7. The combination with a corrugated tube depending for flexibility upon the bending of the metal to permit the corrugation sides to move toward and away from each other, said tube comprising a helical strip having edges of adjacent convolutions interfolded and said strip having a longitudinal fold or groove, the said interfolded edges being at the outermost portion of the wall of the tube, of a tubular structure enveloping said corrugated tube, said tubular structure bridging across the groove between the corrugations and not entering therein, whereby engagement of the said structure against corrugation sides as they move toward and away from each other as the tube is flexed, is prevented.

8. The combination with a corrugated tube depending for flexibility upon the bending of the metal to permit the corrugation sides to move toward and away from each other, comprising a helical strip having edges of adjacent convolutions interfolded and said strip having a longitudinal fold or groove, the said interfolded edges being at the outer most portion of the wall of the tube, and an outer tube inclosing the aforesaid corrugated tube, said outer tube bridging across grooves between the corrugations and not entering therein whereby engagement of the said outer tube against the corrugation sides as they move toward and away from each other as the tube is flexed, is prevented, said outer tube comprising a helical strip having edges of adjacent convolutions secured together by a joint having clearances permitting relative movement of the parts within the joint, and coupling terminals secured to the ends of said outer tube.

9. The combination with a corrugated tube depending for flexibility upon the bending of the metal to permit the corrugation sides to move toward and away from each other, of a flexible tubular structure surrounding said tube, cushioning means between said tubular structure and said corrugated tube and coupling terminals secured to the ends of said structure, said tubular structure bridging across the groove between corrugations and not entering therein, whereby engagement of the said structure against corrugation sides as they move toward and away from each other as the tube is flexed, is prevented.

10. The combination with a corrugated tube depending for flexibility upon the bending of the metal to permit the corrugation sides to move toward and away from each other, comprising a helical strip having edges of adjacent convolutions interfolded and said strip having a longitudinal fold or groove, the said interfolded edges being at the outer most portion of the wall of the tube, and an outer tube inclosing the aforesaid corrugated tube, said outer tube bridging across grooves between the corrugations and not entering therein whereby engagement of the said outer tube against the corrugation sides as they move toward and away from each other as the tube is flexed, is prevented, said outer tube comprising a helical strip having edges of adjacent convolutions secured together by a joint having clearances permitting relative movement of the parts within the joint.

11. The combination with a corrugated tube depending for flexibility upon the bending of the metal to permit the corrugation sides to move toward and away from each other, of a flexible outer tube inclosing the said corrugated tube and comprising a helical strip having the edges of adjacent convolutions joined together with clearances permitting relative movement of the parts in the joint, the said outer tube bridging across the groove between corrugations and not entering therein, whereby engagement of the said outer tube against the corrugation sides as they move toward and away from each other as the tube is flexed, is prevented, and coupling terminals secured to the ends of said tubes, the said terminals being assembled with said tubes while the outer tube is in extended position and the inner tube is in compressed condition.

12. The combination with a corrugated tube comprising a helical strip having a longitudinal groove and having the edges of adjacent convolutions interfolded, the tube depending for flexibility upon the bending of the metal to permit the corrugation sides to move toward and away from each other, of means for preventing twisting of the said tube whereby tendency to cause sliding of the edges of adjacent convolutions in the joint is overcome.

13. The combination with a corrugated tube comprising a helical strip having a longitudinal groove and having the edges of adjacent convolutions interfolded, the tube depending for flexibility upon the bending of the metal to permit the corrugation sides to move toward and away from each other, of flexible means for preventing twisting of the tube whereby flexure of the tube is permitted, but tendency to cause sliding in the joint between adjacent edges of convolutions is overcome.

In testimony whereof I have signed this specification this 9th day of September, 1916.

LOUIS H. BRINKMAN.